United States Patent [19]

Pauly

[11] 4,000,733
[45] Jan. 4, 1977

[54] SOLAR FURNACE

[76] Inventor: Lou Allen Pauly, c/o Nels Welch 25568 Wolf Creek Road, Veneta, Oreg. 97487

[22] Filed: Oct. 31, 1975

[21] Appl. No.: 627,600

[52] U.S. Cl. .............................. 126/270; 423/220; 423/248
[51] Int. Cl.[2] .......................................... F24J 3/02
[58] Field of Search .............. 126/270, 271; 110/1; 237/1 A; 423/220, 248

[56] References Cited

UNITED STATES PATENTS

| 1,951,404 | 3/1934 | Goddard | 126/270 |
|---|---|---|---|
| 2,976,533 | 3/1961 | Salisbury | 126/270 |
| 3,118,437 | 1/1964 | Hunt | 126/270 |
| 3,171,403 | 3/1965 | Drescher | 126/270 |
| 3,300,561 | 1/1967 | Foex | 126/270 |
| 3,884,217 | 3/1975 | Wartes | 126/270 |

Primary Examiner—Kenneth W. Sprague
Attorney, Agent, or Firm—James D. Givnan, Jr.

[57] ABSTRACT

A solar furnace receiving reflected solar energy from a battery of remote, positionable mirrors with the furnace having primary and secondary reflectors directing concentrated radiant energy toward a Fresnel lens. The focal point of the lens is located within a furnace chamber into which is advanced a carbon conduit, the advancing end of which is vaporized by focal point temperatures. The vaporized carbon serves as a catalyst for the production of hydrogen. The furnace chamber is in upstream communication with means for separating hydrogen and carbon dioxide.

4 Claims, 2 Drawing Figures

SOLAR FURNACE

BACKGROUND OF THE INVENTION

The present invention relates generally to furnaces utilizing solar energy as a heat source and more particularly to such a furnace having multiple parabolic reflectors and a Fresnel lens joined in a single mirror structure.

Well known in solar energy utilization is the use of a multitude of mirrors remotely located from a furnace with each positionable so as to track the apparent movement of the sun and reflect radiant energy towards the furnace. Also known in the art is the use of parabolic mirrors and Fresnel mirrors to concentrate radiant energy toward a heat transferring body of the furnace. Typically the focal point of the converging rays will lie in a plane common to a furnace wall or like conductive structure whereat radiant energy is converted to heat for transfer to a medium.

SUMMARY OF THE INVENTION

The present invention is embodied within a solar furnace including opposing reflectors serving to direct radiant energy toward a Fresnel lens of the furnace.

The reflectors of the present furnace receive radiant energy from a battery of mirrors each positionable and remotely disposed from the furnace. The cooperating reflectors constituting part of the present invention are joined in a unitary furnace structure which additionally includes a Fresnel lens. The lens focal point is adjacent the discharge end of a conduit and is adapted to carry a gaseous flow. Vaporization of the advancing conduit end provides a catalyst for the production of hydrogen. The conduit is adapted for progressive, axial movement into the furnace chamber.

BRIEF DESCRIPTION OF THE DRAWING

In the accompanying drawing.

DETAILED DESCRIPTION OF THE PREFERRED EMBODIMENT

Figure 1:
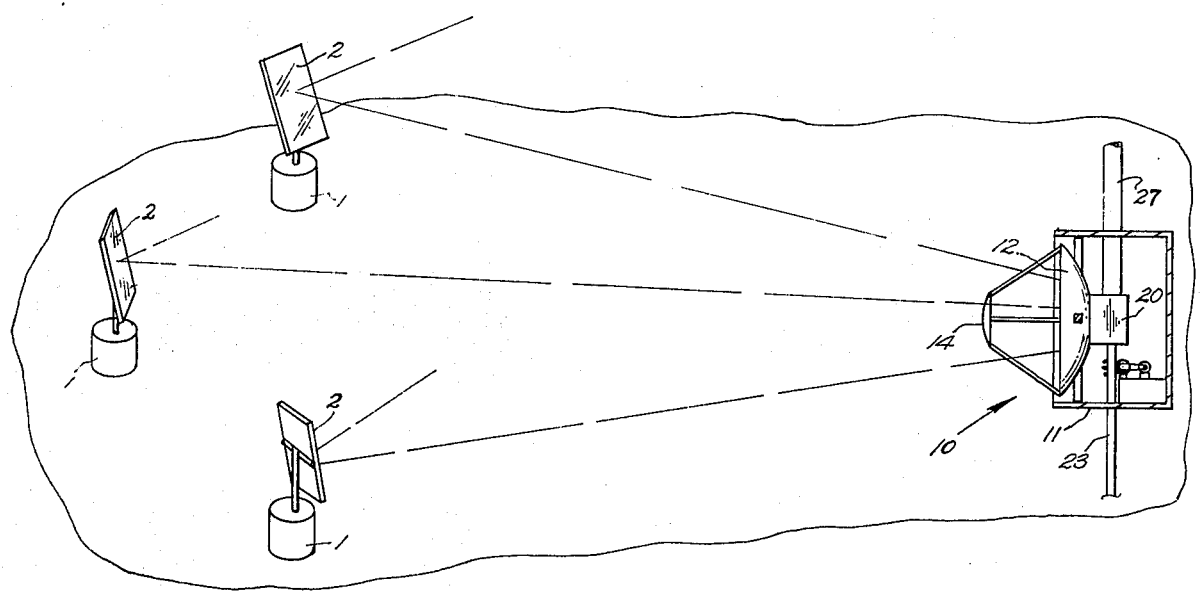
FIG. 1 is a diagrammatic view of a furnace system for the utilization of radiant energy.

With continuing attention to the accompanying drawing wherein applied reference numerals indicate parts similarly identified in the following description, the reference numeral 1 indicates remote mirror units each including a reflector panel 2 positionable in response to signals originating at a light sensing tracking device on each unit. The panels 2 may be said to track the apparent travel of the sun above the horizon so as to reflect radiant energy toward the present solar furnace. Within the state of the art are such reflector units and therefore further details of same are dispensed with.

A solar furnace embodying the present invention is indicated generally at 10 and includes a housing 11 serving to mount mirror components and to isolate furnace components from ambient air. Preferably furnace structure 10 is of stationary construction.

Figure 2:
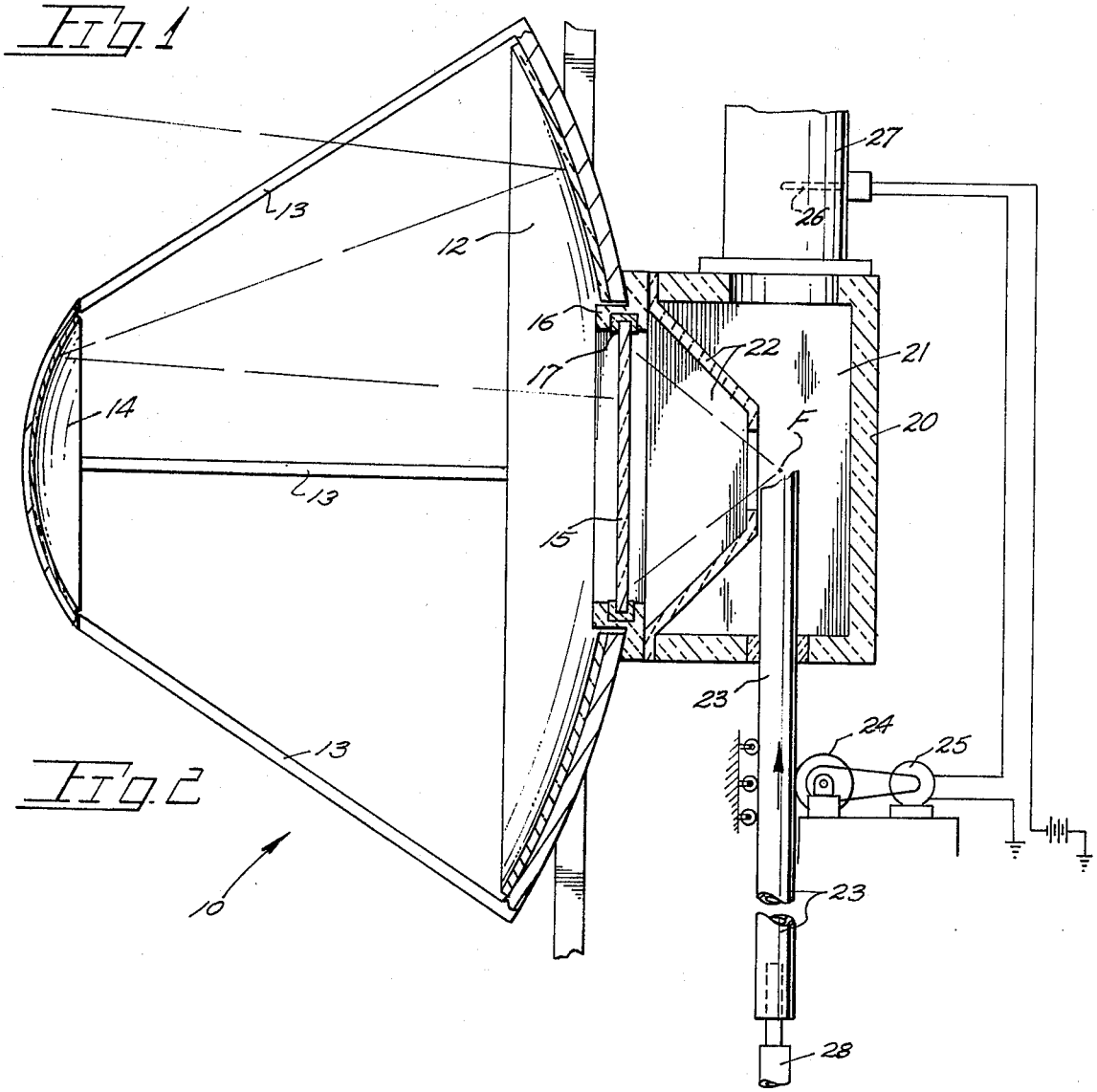
FIG. 2 is a vertical sectional view of a solar furnace embodying the present invention removed from its supporting enclosure.

With attention to FIG. 2 the primary reflector is indicated at 12 and is of parabolic shape with a suitable reflective surface to reflect incoming solar rays toward the major axis of the reflector. A concentration of radiant energy is imparted to the primary reflector from the multiple reflector units 1.

In fixed relationship with the primary reflector by means of suitable supports or struts 13 is a secondary reflector 14 of lesser size but also of parabolic configuration with a reflective surface. Both of said primary and secondary reflectors have aligned axes.

A Fresnel lens is indicated at 15 disposed normal to the above mentioned axes. The lens may be structurally integrated with the primary reflector. A lens mount is indicated at 16 which is conveniently supported by said primary reflector and includes an insulative retainer 17 within which the Fresnel lens is positioned.

An expansion chamber 21 is located rearwardly of the lens within an enclosure 20 also within which is located the focal point at F of lens 15. An apertured partition at 22 permits unobstructed passage of the converging focused rays while serving to protect the lens.

Extending into the furnace is a movable conduit 23 which is advanced into the furnace chamber by drive means at 24 so as to at all times retain an upper end of conduit in close proximity to focal point F of the Fresnel lens. The conduit, being of carbon, vaporizes upon entering the focal area of lens 15.

Friction drive means 24 includes a gearhead motor 25, the operation of which is controlled by a control system including a sensor 26 located in a furnace outlet 27. Various other types of drive means may serve equally well to advance conduit 23 into the furnace chamber.

The outer or lower end of conduit 23 is in communication with a source of steam such as by a flexible conduit 28.

In operation, carbon conduit 23 through which steam is routed is progressively advanced toward focal point F whereat concentrated radiant energy vaporizes the conduit for the formation of hydrogen and carbon dioxide within furnace chamber 21. As hydrogen is highly useful when isolated, the combined flow of hydrogen and carbon dioxide is routed through separating means such as water whereat carbon dioxide is removed from the furnace outlet flow.

While I have shown but one embodiment of the invention it will be apparent to those skilled in the art that the invention may be embodied still otherwise without departing from the spirit and scope of the invention.

Having thus described the invention what is desired to be secured under a Letters Patent is:

1. In a system for concentrating radiant energy including multiple positionable mirrors remotely located from and reflecting radiant energy toward a solar furnace, the improvement embodied in a solar furnace, comprising
    a primary reflector receiving radiant energy from said positionable mirrors,
    a secondary reflector axially offset from said primary reflector redirecting radiant energy towards said primary reflector,
    a Fresnel lens disposed normal to the aligned axes of said primary and secondary reflectors and receiving radiant energy from said secondary reflector, and
    a chamber defined by furnace structure within which the focal point of the Fresnel lens is located, said chamber adapted to receive conduit means carrying an oxygen and hydrogen flow and having a discharge end in close proximity to the focal point of the Fresnel lens whereby the conduit and conduit flow are heated by concentrated radiant energy.

2. The furnace improvement claimed in claim 1 wherein said conduit is of carbon vaporized by concentrated radiant energy.

3. The furnace improvement claimed in claim 2 additionally including means for progressively advancing said conduit into the furnace chamber.

4. The furnace improvement claimed in claim 3 wherein said conduit means serves to convey a steam flow into said furnace chamber for the production of hydrogen and carbon dioxide in the furnace chamber.

* * * * *